(12) United States Patent
Lenaerts et al.

(10) Patent No.: US 11,802,215 B2
(45) Date of Patent: *Oct. 31, 2023

(54) AQUEOUS INKJET INK SETS AND INKJET PRINTING METHODS

(71) Applicant: AGFA NV, Mortsel (BE)

(72) Inventors: Jens Lenaerts, Mortsel (BE); Nadine Willems, Mortsel (BE); Lionel Petton, Mortsel (BE); Amandine Ligot, Mortsel (BE); Sonny Wynants, Mortsel (BE)

(73) Assignee: AGFA NV, Mortsel (BE)

( * ) Notice: Subject to any disclaimer, the term of this patent is extended or adjusted under 35 U.S.C. 154(b) by 0 days.

This patent is subject to a terminal disclaimer.

(21) Appl. No.: 17/527,343

(22) Filed: Nov. 16, 2021

(65) Prior Publication Data

US 2022/0073774 A1 Mar. 10, 2022

Related U.S. Application Data

(63) Continuation of application No. 16/640,444, filed as application No. PCT/EP2018/072202 on Aug. 16, 2018, now Pat. No. 11,207,899.

(30) Foreign Application Priority Data

Aug. 22, 2017 (EP) .................................. 17187192

(51) Int. Cl.
*C09D 11/40* (2014.01)
*B41M 5/00* (2006.01)
(Continued)

(52) U.S. Cl.
CPC .............. *C09D 11/40* (2013.01); *B32B 13/08* (2013.01); *B32B 21/06* (2013.01); *B32B 29/005* (2013.01);
(Continued)

(58) Field of Classification Search
CPC ... B41J 2/01; B41J 2/211; B41J 2/1433; B41J 2/17; B41J 2/17593; B41J 2/2107;
(Continued)

(56) References Cited

U.S. PATENT DOCUMENTS 5,854,308 A 12/1998 Kuo et al.
2003/0106461 A1 6/2003 Sano
(Continued)

FOREIGN PATENT DOCUMENTS

CN 105658436 A 6/2016
EP 1239011 A1 9/2002
(Continued)

OTHER PUBLICATIONS

European Patent Office, International Search Report in International Patent Application No. PCT/EP2018/077202, dated Nov. 2, 2018, 3 pp.
(Continued)

*Primary Examiner* — Manish S Shah
(74) *Attorney, Agent, or Firm* — Leydig, Voit & Mayer, Ltd.

(57) ABSTRACT

A pigmented aqueous inkjet ink set for manufacturing decorative panels comprising: a) a cyan aqueous inkjet ink containing a copper phthalocyanine pigment; b) a red aqueous inkjet ink containing a red pigment selected from the group consisting of C.I. Pigment Red 254, C.I. Pigment Red 122, C.I. Pigment Red 176 and mixed crystals thereof; c) a yellow aqueous inkjet ink containing a pigment C.I Pigment Yellow 150 or a mixed crystal thereof; and d) a black aqueous inkjet ink containing a carbon black pigment; wherein the aqueous inkjet inks contain a surfactant. An inkjet printing method for manufacturing decorative panels is also disclosed.

19 Claims, 1 Drawing Sheet

(51) Int. Cl.
  *C09D 11/023* (2014.01)
  *C09D 11/322* (2014.01)
  *C09D 11/38* (2014.01)
  *B41J 2/21* (2006.01)
  *B41J 11/00* (2006.01)
  *B32B 29/00* (2006.01)
  *B32B 13/08* (2006.01)
  *B32B 21/06* (2006.01)
  *B41M 5/52* (2006.01)
  *B41M 7/00* (2006.01)

(52) U.S. Cl.
  CPC .......... *B32B 29/007* (2013.01); *B41J 2/2107* (2013.01); *B41J 11/002* (2013.01); *B41M 5/0023* (2013.01); *C09D 11/023* (2013.01); *C09D 11/322* (2013.01); *C09D 11/38* (2013.01); *B32B 2255/12* (2013.01); *B32B 2255/20* (2013.01); *B32B 2255/26* (2013.01); *B41M 5/5218* (2013.01); *B41M 5/5254* (2013.01); *B41M 7/0027* (2013.01)

(58) Field of Classification Search
  CPC ...... B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 25/001; B41J 25/34; B41J 25/003; B41J 25/312; B41J 2025/008; B41J 2202/21; B41J 2/17596; B41J 2/16508; B41J 2/1652; B41J 2/175; B41J 2/17563; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; C09D 11/326; C09D 11/107; C09D 11/03; C09D 11/037; C09D 11/033; B41M 5/0011; B41M 5/0017; B41M 5/0023; B41M 5/0047; B41M 7/00; B41M 7/0072; B41M 5/52; B41M 5/5218; B41M 5/5227
  See application file for complete search history.

(56) References Cited

U.S. PATENT DOCUMENTS

| | | |
|---|---|---|
| 2004/0255809 A1 | 12/2004 | Horie |
| 2009/0033729 A1 | 2/2009 | Bauer et al. |
| 2013/0078437 A1 | 3/2013 | Symkens et al. |
| 2014/0248473 A1 | 9/2014 | Makuta |
| 2015/0030818 A1 | 1/2015 | Fujii et al. |
| 2015/0224790 A1 | 8/2015 | Clement et al. |
| 2016/0052302 A1 | 2/2016 | Willems et al. |
| 2016/0208121 A1* | 7/2016 | De Mondt ............ B41J 2/21 |
| 2016/0214395 A1* | 7/2016 | Torfs ................ B41J 2/2107 |
| 2017/0106670 A1 | 4/2017 | Clement et al. |
| 2017/0218203 A1 | 8/2017 | Harada et al. |
| 2018/0170083 A1 | 6/2018 | De Mondt |
| 2020/0207118 A1 | 7/2020 | Lenaerts et al. |

FOREIGN PATENT DOCUMENTS

| | | |
|---|---|---|
| EP | 1857511 A1 | 11/2007 |
| EP | 2173826 A2 | 4/2010 |
| EP | 2623567 A1 | 8/2013 |
| EP | 2865528 A1 | 4/2015 |
| JP | 2013-001746 A | 1/2013 |
| JP | 2017-088658 A | 5/2017 |
| WO | WO 2009/018294 A2 | 2/2009 |
| WO | WO 2015/059002 A1 | 4/2015 |
| WO | WO 2016/066531 A1 | 5/2016 |

OTHER PUBLICATIONS

European Patent Office, Written Opinion in International Patent Application No. PCT/EP2018/077202, dated Nov. 2, 2018, 6 pp.
International Bureau of WIPO, International Preliminary Report on Patentability in International Patent Application No. PCT/EP2018/077202, dated Apr. 8, 2020, 7 pp.

* cited by examiner

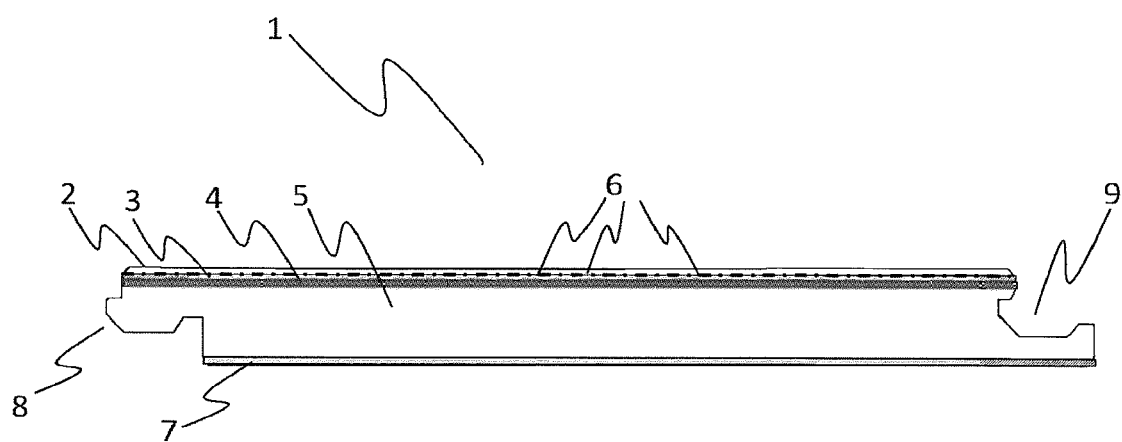

AQUEOUS INKJET INK SETS AND INKJET PRINTING METHODS

CROSS REFERENCE TO RELATED APPLICATIONS

This patent application is a continuation application of copending U.S. patent application Ser. No. 16/640,444, filed Feb. 20, 2020, which is a 371 National Stage Application of PCT/EP2018/072202, filed Aug. 16, 2018. This application claims the benefit of European Application No. 17187192.4, filed Aug. 22, 2017, which is incorporated by reference herein in its entirety.

BACKGROUND OF THE INVENTION

1. Field of the Invention

The present invention relates to aqueous inkjet inks and inkjet printing therewith for manufacturing decorative panels, such as flooring, kitchen, furniture and wall panels.

2. Description of the Related Art

Traditionally, gravure printing was used for manufacturing laminate flooring panels. For short production runs and personalized products, inkjet technology has now also found some implementation in production lines.

It was found that a combination of flooring laminates having a wood motif made using gravure and flooring laminates having the same wood motif and further including company logos and text, which was made using inkjet technology, exhibited problems of colour differences, especially under certain lighting conditions. The latter phenomenon is also known as metamerism. A customer expects that the wood flooring laminates made by gravure and inkjet technology have the same colour whether viewed in daylight, under halogen lighting or under Neon lighting.

The use of a "standard" ink set of CMYK inks is insufficient to solve problems of true wood colour reproduction and metamerism. The general approach is to expand the ink set with other colour inks, such as a red ink, an orange ink and a violet ink. For example, EP 2173826 A (HP) discloses an ink set including a red ink and a magenta ink exhibiting an enhanced colour gamut volume and a reduced metamerism. Improvement has also been found by including so-called light and dark inks. US 2009033729 A (HP) discloses an ink set including a light magenta ink and a dark magenta ink to enhance the colour gamut and reduce metamerism. However the downside of using an extended set of inkjet inks is that the inkjet printing process requires a more complex inkjet printer and image processing software.

Several inkjet ink sets have suggested improvements for metamerism without increasing the number of inkjet inks to more than four. For example, US 2003106461 A (SEIKO EPSON) discloses an aqueous inkjet ink set combining a yellow ink, a magenta ink and a cyan ink with an additional inkjet ink including a mixture of a yellow pigment, a magenta pigment and a cyan pigment, in order to reduce metamerism.

EP 1239011 A (SEIKO EPSON) discloses an aqueous inkjet ink set for reducing metamerism including a yellow ink containing C.I. Pigment Yellow 110; a magenta ink containing C.I. Pigment red 122 and/or C.I. Pigment Red 202; and a cyan ink containing C.I. Pigment Blue 15:3 and/or C.I. Pigment Blue 15:4.

EP 2623567 A (AGFA) discloses a UV curable inkjet ink set consisting of a black inkjet ink, a cyan inkjet ink and two inkjet inks (A) and (B), optionally complemented by a white ink and/or a colourless ink, wherein the inkjet ink (A) has a hue angle H* between 70 and 85 and a chroma C* between 30 and 80; the inkjet ink (B) has a hue angle H* between 20 and 40 and a chroma C* between 30 and 80; and the CIE L* a* b* coordinates were determined on polyethylene coated white paper for a 2° observer under a D50 light source.

EP 2865528 A (AGFA) discloses an aqueous inkjet ink set for manufacturing decorative surfaces consisting of: a) a cyan aqueous inkjet ink containing a copper phthalocyanine pigment; b) a red aqueous inkjet ink containing a pigment C.I Pigment Red 254 or a mixed crystal thereof; c) a yellow aqueous inkjet ink containing a pigment C.I Pigment Yellow 151 or a mixed crystal thereof; and d) a black aqueous inkjet ink containing a carbon black pigment; with the proviso that the aqueous inkjet inks do not include a polymer latex binder.

Hence, there is still a need for improved aqueous inkjet ink sets and inkjet printing methods for manufacturing decorative surfaces not requiring a complex inkjet printer and image processing software to use an extended set of inkjet inks for a true reproduction of wood colours having minimal metamerism.

SUMMARY OF THE INVENTION

In order to overcome the problems described above, preferred embodiments of the present invention have been realised with a pigmented aqueous inkjet ink set as defined below.

It was found that the specific selection of C.I Pigment Yellow 150 or a mixed crystal thereof for pigment in the yellow aqueous inkjet ink and the combination with a specific red aqueous inkjet ink containing a red pigment selected from the group consisting of C.I. Pigment Red 254, C.I. Pigment Red 122, C.I. Pigment Red 176 and mixed crystals thereof in a CRYK inkjet ink set allowed for superior metamerism.

Another important advantage of the invention is that the pigment aqueous inkjet ink set exhibited high printing reliability and high productivity, which are essential for a manufacturing environment.

Further advantages and embodiments of the present invention will become apparent from the following description.

BRIEF DESCRIPTION OF THE DRAWINGS

FIG. 1 shows a cross-section of an embodiment of a decorative panel (1) including, in order, a protective layer (2), an outermost ink receiving layer (3), an inner ink receiving layer (4), a core layer (5) with a tongue (8) and a groove (9) and a balancing layer (7), wherein the ink receiving layers include a jetted and dried colour image (6).

DETAILED DESCRIPTION OF THE PREFERRED EMBODIMENTS

Definitions

The term "alkyl" means all variants possible for each number of carbon atoms in the alkyl group i.e. methyl, ethyl, for three carbon atoms: n-propyl and isopropyl; for four carbon atoms: n-butyl, isobutyl and tertiary-butyl; for five carbon atoms: n-pentyl, 1,1-dimethyl-propyl, 2,2-dimethyl-propyl and 2-methyl-butyl, etc.

Unless otherwise specified a substituted or unsubstituted alkyl group is preferably a $C_1$ to $C_6$-alkyl group.

Unless otherwise specified a substituted or unsubstituted alkenyl group is preferably a $C_2$ to $C_6$-alkenyl group.

Unless otherwise specified a substituted or unsubstituted alkynyl group is preferably a $C_2$ to $C_6$-alkynyl group.

Unless otherwise specified a substituted or unsubstituted aralkyl group is preferably phenyl group or naphthyl group including one, two, three or more $C_1$ to $C_6$-alkyl groups.

Unless otherwise specified a substituted or unsubstituted alkaryl group is preferably a $C_1$ to $C_6$-alkyl group including a phenyl group or naphthyl group.

Unless otherwise specified a substituted or unsubstituted aryl group is preferably a phenyl group or naphthyl group.

Unless otherwise specified a substituted or unsubstituted heteroaryl group is preferably a five- or six-membered ring substituted by one, two or three oxygen atoms, nitrogen atoms, sulphur atoms, selenium atoms or combinations thereof.

The term "substituted", in e.g. substituted alkyl group means that the alkyl group may be substituted by other atoms than the atoms normally present in such a group, i.e. carbon and hydrogen. For example, a substituted alkyl group may include a halogen atom or a thiol group. An unsubstituted alkyl group contains only carbon and hydrogen atoms.

Unless otherwise specified a substituted alkyl group, a substituted alkenyl group, a substituted alkynyl group, a substituted aralkyl group, a substituted alkaryl group, a substituted aryl and a substituted heteroaryl group are preferably substituted by one or more substituents selected from the group consisting of methyl, ethyl, n-propyl, isopropyl, n-butyl, isobutyl and tertiary-butyl, ester, amide, ether, thioether, ketone, aldehyde, sulfoxide, sulfone, sulfonate ester, sulphonamide, —Cl, —Br, —I, —OH, —SH, —CN and —$NO_2$.

Pigmented Aqueous Inkjet Ink Sets

A pigmented aqueous inkjet ink set according to a preferred embodiment of the invention comprises: a) optionally a cyan aqueous inkjet ink containing a copper phthalocyanine pigment, preferably a β-copper phthalocyanine pigment; b) a red aqueous inkjet ink containing a red pigment selected from the group consisting of C.I. Pigment Red 254, C.I. Pigment Red 122, C.I. Pigment Red 176 and mixed crystals thereof; c) a yellow aqueous inkjet ink containing a pigment C.I Pigment Yellow 150 or a mixed crystal thereof; and d) a black aqueous inkjet ink containing a carbon black pigment; wherein the aqueous inkjet inks contain a surfactant. For printing wood motifs often no cyan aqueous inkjet ink is required, however preferably a cyan aqueous inkjet ink is present in the aqueous inkjet ink set as this allows for printing non-wood motifs, such as a fantasy motif or company logo's containing a blue color.

In a more preferred embodiment, the aqueous inkjet ink set consists of the cyan, red, yellow and black aqueous inkjet inks. The advantage of using such an inkjet ink set is mainly an economical benefit. By using only the specific four inkjet inks, a less expensive inkjet printing device can be made and used and consequently also cheaper maintenance is obtained, although an excellent reproduction of wood motif colour images is still achieved.

In addition to specific colour pigments, the inkjet inks contain also a surfactant, preferably a fluorosurfactant. The surfactant allows for spreading on the décor paper, which enhances indirectly also the metamerism. In a preferred embodiment of the pigmented aqueous inkjet ink set, the pigmented aqueous inkjet inks have a static surface tension at 25° C. between 19.0 mN·m and 27.0 mN·m for good spreading on the décor paper.

The hue angle H* of a red inkjet ink is normally in the range of 15° to 65°. For providing good reproduction of wood colour images, the hue angle H* of a red inkjet ink in the present invention is preferably between 15° and 50°, more preferably between 20° and 40°. In a preferred embodiment of the pigmented aqueous inkjet ink set, the red pigment is C.I. Pigment Red 254 or a mixed crystal thereof.

The hue angle of a yellow inkjet ink is usually in the range of 75° to 110°. For providing good reproduction of wood colour images, the hue angle H* of a yellow inkjet ink in the present invention is preferably between 80° and 105°, more preferably between 85° and 95°. In a preferred embodiment of the pigmented aqueous inkjet ink set, the hue angle H* of the yellow aqueous inkjet ink is higher than 85°, more preferably between 86° and 98°, and most preferably between 87° and 95°.

The pigmented aqueous inkjet inks in the ink set should preferably also have a chroma C* of at least more than 50.

In a preferred embodiment of the pigmented aqueous inkjet ink set, the pigmented aqueous inkjet inks all have a pigment concentration of at least 2.0 wt % with the weight percentage wt % based on the total weight of the pigmented aqueous inkjet inks. With a pigment concentration of at least 2.0 wt %, more preferably at least 2.2 wt %, very dark coloured wood motifs can be produced without applying too much inkjet ink, which can result in reduced adhesion of the protective layer to the decorative layer. The application of the inkjet ink is preferably limited to a dry weight of no more than 5.0 $g/m^2$, more preferably no more than 4.0 $g/m^2$ or even 3.0 $g/m^2$. A higher amount can lead to delamination, i.e. adhesion problems, because the ink layer acts as a barrier layer for water vapour formed by the crosslinking of the thermosetting resin.

The pigment concentration in all aqueous inkjet inks is preferably between 2.2 and 6.0 wt % with the wt % based on the total weight of the ink. Higher pigment concentration tend to limit the number of colours that can be produced and increases the graininess.

Inkjet Printing Methods

An inkjet printing method for manufacturing decorative panels according to a preferred embodiment of the invention comprises the steps of:

a) providing a paper substrate including one or more ink receiving layers;

b) jetting a colour image with one or more pigmented aqueous inkjet inks from the above pigmented aqueous inkjet ink set on the paper substrate including one or more ink receiving layers; and c) drying the jetted colour image.

The application of ink receiving layers on the paper substrate allow to achieve a desired image quality without the need of a polymer latex binder in the aqueous inkjet inks. The presence of polymer latex binder usually reduces the adhesion of the protective layer to the decorative layer. In a preferred embodiment, no polymer latex binder is present in one or more of the aqueous pigmented inkjet inks, preferably none of the pigmented aqueous inkjet inks contain a polymeric latex binder.

Although single pass inkjet printing allows for high productivity, albeit at a large investment cost for the inkjet printer, the inkjet printing method is preferably performed in a multi-pass mode. When the jetting of the colour image by the inkjet print heads is performed in 2, 3, 4 or more passes, the presence of failing nozzles can be masked to a level wherein it becomes no longer visible that a nozzle is not firing inkjet ink; the latter is usually immediately visible in a single pass inkjet printing process, thus creating substantial amount of waste and economic penalties.

Decorative panels often use a wood motif having wood nerves as a colour image. It was observed that improved image quality is obtained when the inkjet printing is performed in a manner that the wood nerves in the colour image are extending in a direction substantially corresponding to the inkjet printing direction. For a single pass inkjet printing process, the inkjet printing direction is the transport direction of the paper substrate including one or more ink receiving layers. In a multi-pass inkjet printing process, the inkjet printing direction is the scanning direction of the print heads.

In a preferred embodiment of the inkjet printing method, the paper substrate includes multiple ink receiving layers and an outermost ink receiving layer which contains no inorganic pigment or an amount of inorganic pigment smaller than that of the one or more ink receiving layers located between the paper substrate and the outermost ink receiving layer. The advantage is that the printing reliability is enhanced. For fast drying, the ink receiving layers contain high amounts of inorganic pigments, such as fumed silica, which can create dust problems due to the transporting of the paper substrate in the inkjet printer, especially in a single pass inkjet printing pass where very high speeds for transporting the paper substrate below the print heads are used. This dust problem is reduced by having an outermost ink receiving layer containing no or only a small amount of inorganic pigments.

In a preferred embodiment of the inkjet printing method, the paper substrate is a coloured paper substrate, more preferably a bulk coloured paper substrate. The use of a coloured paper substrate reduces the amount of inkjet ink required to form the colour image.

In a preferred embodiment of the inkjet printing method, the one or more ink receiving layers include an inorganic pigment selected from the group consisting of alumina hydrates, aluminum oxides, aluminum hydroxides, aluminum silicates, and silicas. The latter inorganic pigments allow for fast drying and high image quality.

In a preferred embodiment of the inkjet printing method, the one or more ink receiving layers contain a polymeric binder selected from the group consisting of polyvinylalcohol, a vinylalcohol copolymer or modified polyvinyl alcohol. The latter polymeric binders are very hydrophilic and allow fast penetration of the liquids in the aqueous inkjet inks, again enhancing drying and high image quality.

For having a good ejecting ability and fast inkjet printing, the viscosity of the one or more aqueous inkjet inks at a temperature of 32° C. is preferably smaller than 15 mPa·s, and most preferably between 5 and 12 mPa·s all at a shear rate of $1,000$ $s^{-1}$. A preferred jetting temperature is between 10 and 70° C., more preferably between 20 and 40° C., and most preferably between 25 and 35° C. In a preferred embodiment of the inkjet printing method, the one or more aqueous inkjet inks are jetted at a jetting temperature of not more than 35° C.

Colour Pigments

For reasons of light fastness, the colorants in the aqueous inkjet inks are colour pigments and preferably do not include any dyes. The aqueous inkjet inks preferably contain a dispersant, more preferably a polymeric dispersant, for dispersing the pigment. One or more aqueous inkjet inks may contain a dispersion synergist to improve the dispersion quality and stability of the ink.

In a preferred embodiment of the aqueous inkjet inks, one or more pigmented aqueous inkjet inks may contain a so-called "self dispersible" colour pigment. A self-dispersible colour pigment requires no dispersant, because the pigment surface has ionic groups, which realize electrostatic stabilization of the pigment dispersion. In case of self-dispersible colour pigments, the steric stabilization obtained by using a polymeric dispersant becomes optional. The preparation of self-dispersible colour pigments is well-known in the art and can be exemplified by EP 904327 A (CABOT).

A particularly preferred pigment for a cyan aqueous inkjet ink is a copper phthalocyanine pigment, more preferably C.I. Pigment Blue 15:3 or C.I. Pigment Blue 15:4.

Particularly preferred pigments for a red aqueous inkjet ink are C.I Pigment Red 254 and C.I. Pigment Red 122, C.I. Pigment Red 176 and mixed crystals thereof.

For the black ink, suitable pigment materials include carbon blacks such as Regal™ 400R, Mogul™ L, Elftex™ 320 from Cabot Co., or Carbon Black FW18, Special Black™ 250, Special Black™ 350, Special Black™ 550, Printex™ 25, Printex™ 35, Printex™ 55, Printex™ 90, Printex™ 150T from DEGUSSA Co., MA8 from MITSUBISHI CHEMICAL Co., and C.I. Pigment Black 7.

Also mixed crystals may be used. Mixed crystals are also referred to as solid solutions. For example, under certain conditions different quinacridones mix with each other to form solid solutions, which are quite different from both physical mixtures of the compounds and from the compounds themselves. In a solid solution, the molecules of the components enter into the same crystal lattice, usually, but not always, that of one of the components. The x-ray diffraction of the resulting crystalline solid is characteristic of that solid and can be clearly differentiated from the pattern of a physical mixture of the same components in the same proportion. In such physical mixtures, the x-ray pattern of each of the components can be distinguished, and the disappearance of many of these lines is one of the criteria of the formation of solid solutions. A commercially available example is Cinquasia™ Magenta RT-355-D from Ciba Specialty Chemicals.

Also mixtures of pigments may be used. For example, the inkjet ink includes a carbon black pigment and at least one pigment selected from the group consisting of a blue pigment, a cyan pigment, magenta pigment and a red pigment. It was found that such a black inkjet ink allowed easier and better colour management for wood colours.

The pigment particles in the pigmented inkjet ink should be sufficiently small to permit free flow of the ink through the inkjet printing device, especially at the ejecting nozzles. It is also desirable to use small particles for maximum colour strength and to slow down sedimentation.

The average particle size of the pigment in the pigmented inkjet ink should be between 50 nm and 300 nm. Preferably, the average pigment particle size is between 80 and 200 nm, more preferably between 100 and 150 nm. Below an average particle size of 50 nm, a reduction is often observed in light fastness. Above an average particle size of 300 nm, the colour gamut is usually reduced.

Dispersants

The pigmented inkjet ink preferably contains a dispersant, more preferably a polymeric dispersant, for dispersing the pigment.

Suitable polymeric dispersants are copolymers of two monomers but they may contain three, four, five or even more monomers. The properties of polymeric dispersants depend on both the nature of the monomers and their distribution in the polymer. Copolymeric dispersants preferably have the following polymer compositions:
- statistically polymerized monomers (e.g. monomers A and B polymerized into ABBAABAB);
- alternating polymerized monomers (e.g. monomers A and B polymerized into ABABABAB);
- gradient (tapered) polymerized monomers (e.g. monomers A and B polymerized into AAABAABBABBB);
- block copolymers (e.g. monomers A and B polymerized into AAAAABBBBBB) wherein the block length of each of the blocks (2, 3, 4, 5 or even more) is important for the dispersion capability of the polymeric dispersant;
- graft copolymers (graft copolymers consist of a polymeric backbone with polymeric side chains attached to the backbone); and
- mixed forms of these polymers, e.g. blocky gradient copolymers.

Suitable dispersants are DISPERBYK™ dispersants available from BYK CHEMIE, JONCRYL™ dispersants available from JOHNSON POLYMERS and SOLSPERSE™ dispersants available from ZENECA. A detailed list of non-polymeric as well as some polymeric dispersants is disclosed by MC CUTCHEON. Functional Materials, North American Edition. Glen Rock, N.J.: Manufacturing Confectioner Publishing Co., 1990. p. 110-129.

The polymeric dispersant has preferably a number average molecular weight Mn between 500 and 30000, more preferably between 1500 and 10000.

The polymeric dispersant has preferably a weight average molecular weight Mw smaller than 100,000, more preferably smaller than 50,000 and most preferably smaller than 30,000.

In a particularly preferred embodiment, the polymeric dispersant used in the one or more pigmented inkjet inks is a copolymer comprising between 3 and 11 mol % of a long aliphatic chain (meth)acrylate wherein the long aliphatic chain contains at least 10 carbon atoms.

The long aliphatic chain (meth)acrylate contains preferably 10 to 18 carbon atoms. The long aliphatic chain (meth)acrylate is preferably decyl (meth)acrylate. The polymeric dispersant can be prepared with a simple controlled polymerization of a mixture of monomers and/or oligomers including between 3 and 11 mol % of a long aliphatic chain (meth)acrylate wherein the long aliphatic chain contains at least 10 carbon atoms.

A commercially available polymeric dispersant being a copolymer comprising between 3 and 11 mol % of a long aliphatic chain (meth)acrylate is Edaplan™ 482, a polymeric dispersant from MUNZING.

For dispersing C.I Pigment Yellow 150 and mixed crystals thereof, the polymeric dispersant is preferably an acrylic block copolymer dispersant, as very good ink stability has been observed with such a polymeric dispersant. A commercial example is Dispex™ Ultra PX 4575 from BASF.

Polymer Latex Binders

One or more of the aqueous inkjet inks may contain a polymer latex binder, preferably a polyurethane based latex. It was observed that polyurethane based latex are less detrimental for adhesion in flooring laminates than acrylic latex binders.

The polymer latex binder is not particularly limited as long as it has stable dispersibility in the ink composition. There is no limitation on the main chain skeleton of the water-insoluble polymer. Examples of the polymer include a vinyl polymer and a condensed polymer (e.g., an epoxy resin, polyester, polyurethane, polyamide, cellulose, polyether, polyurea, polyimide, and polycarbonate). Among the above, a vinyl polymer is particularly preferable because of easily controlled synthesis.

In the preferred embodiment the polymer latex is a polyurethane latex, more preferably a self-dispersible polyurethane latex. The polymer latex binder in the one or more aqueous inkjet inks is preferably a polyurethane based latex binder for reasons of compatibility with the thermosetting resin.

The polymer latex is preferably a self-dispersing polymer latex, and more preferably a self-dispersing polymer latex having a carboxyl group, from the viewpoint of ejecting stability and stability of the liquid (particularly, dispersion stability) when using a colour pigment. The self-dispersing polymer latex means a latex of a water-insoluble polymer that does not contain a free emulsifier and that can get into a dispersed state in an aqueous medium even in the absence of other surfactants due to a functional group (particularly, an acidic group or a salt thereof) that the polymer itself has.

The latex binder polymer particles preferably have a glass transition temperature (Tg) of 30° C. or more.

The minimum film-forming temperature (MFT) of the polymer latex is preferably −25 to 150° C., and more preferably 35 to 130° C.

Surfactants

The aqueous inkjet inks contain at least one surfactant. The surfactant(s) can be anionic, cationic, non-ionic, or zwitter-ionic and are usually added in a total quantity less than 1 wt % based on the total weight of the inkjet ink and particularly in a total quantity less than 0.3 wt % based on the total weight of the inkjet ink. The total quantity above is expressed as dry solids.

Suitable surfactants for the aqueous inkjet inks include fatty acid salts, ester salts of a higher alcohol, alkylbenzene sulphonate salts, sulphosuccinate ester salts and phosphate ester salts of a higher alcohol (for example, sodium dodecylbenzenesulphonate and sodium dioctylsulphosuccinate), ethylene oxide adducts of a higher alcohol, ethylene oxide adducts of an alkylphenol, ethylene oxide adducts of a polyhydric alcohol fatty acid ester, and acetylene glycol and ethylene oxide adducts thereof (for example, polyoxyethylene nonylphenyl ether, and SURFYNOL™ 104, 104H, 440, 465 and TG available from AIR PRODUCTS & CHEMICALS INC.).

Preferred surfactants are selected from fluoro surfactants, such as fluorinated hydrocarbons.

A particularly preferred commercial fluorosurfactant is Capstone™ FS3100 from DU PONT.

In a preferred embodiment of the aqueous inkjet ink, the surfactant is a fluorosurfactant, more preferably an alkoxylated fluorosurfactant, and most preferably an alkoxylated fluorosurfactant containing a sulfonic acid group or a salt thereof.

Particularly preferred is an alkoxylated fluorosurfactant according to Formula (I):

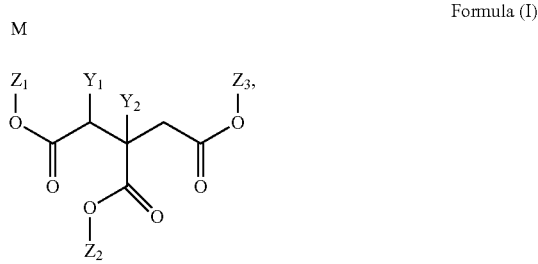

Formula (I)

wherein

- $Z_1$, $Z_2$ and $Z_3$ are, independently of one another, groups of the structure $R(O(CR_1R_2)_c-(CR_3R_4)_d)_e-$, branched alkyl groups, or unbranched alkyl groups, with the proviso that at least one of $Z_1$, $Z_2$ and $Z_3$ represents a group of the structure $R(O(CR_1R_2)_c-(CR_3R_4)_d)_e-$;
- indices c and d are, independently of one another, 0 to 10, with the proviso that c and d are not simultaneously 0;
- e is 0 to 5;
- R is a branched or unbranched, fluorine-containing alkyl radical;
- R1 to R4 are, independently of one another, hydrogen, a branched alkyl group, or an unbranched alkyl group;
- Y1 is an anionic polar group and Y2 is a hydrogen atom, or vice versa; and
- X is a cation, preferably a cation selected from the group $Na^+$, $Li^+$, $K^+$ and $NH_4^+$.

In a preferred embodiment, R1 to R3 represents hydrogen and R4 represents a methyl group, and more preferably the anionic polar group is a sulfonic acid group or a salt thereof.

Particularly preferred examples of alkoxylated fluorosurfactants according to Formula (I) are shown in Table 1.

TABLE 1

FS-1

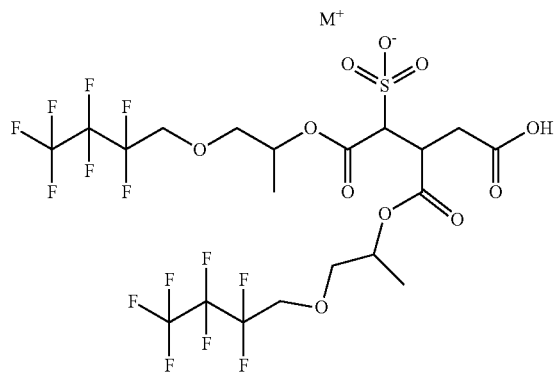

FS-2

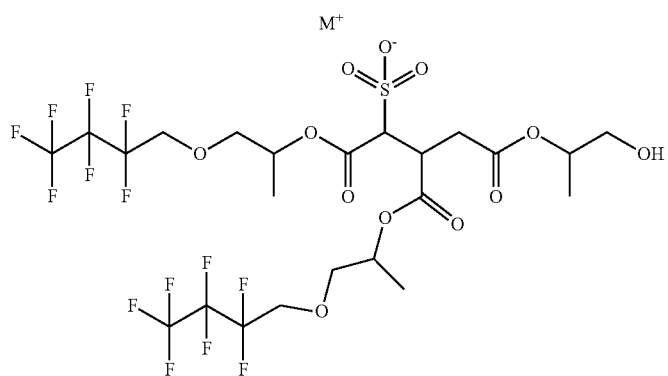

FS-3

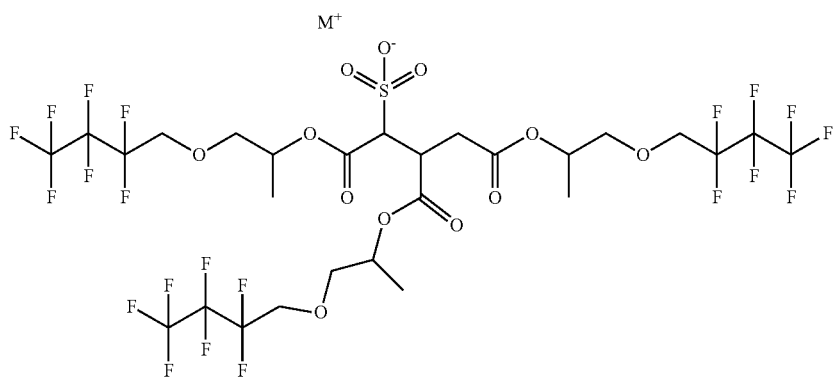

TABLE 1-continued

| FS-4 | 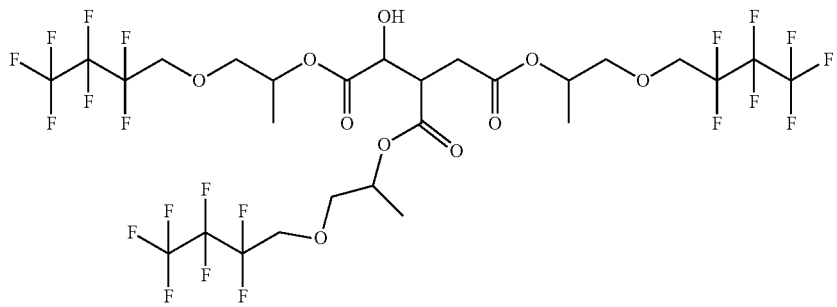 [SMILES: CC(COCC(F)(F)C(F)(F)C(F)(F)F)OC(=O)CC(C(=O)OC(C)COCC(F)(F)C(F)(F)C(F)(F)F)C(O)C(=O)OC(C)COCC(F)(F)C(F)(F)C(F)(F)F] |
|---|---|

Biocides

Suitable biocides for the aqueous inkjet inks used in the present invention include sodium dehydroacetate, 2-phenoxyethanol, sodium benzoate, sodium pyridinethion-1-oxide, ethyl p-hydroxybenzoate and 1,2-benzisothiazolin-3-one and salts thereof.

Preferred biocides are Proxel™ GXL, Proxel™ K and Proxel™ Ultra 5 available from ARCH UK BIOCIDES and Bronidox™ available from COGNIS.

A particularly preferred biocide is a 1,2-benzisothiazolin-3-one based biocide.

A biocide is preferably added in an amount of 0.001 to 3.0 wt %, more preferably 0.01 to 1.0 wt %, each based on the total weight of the pigmented inkjet ink.

Humectants

The aqueous inkjet ink preferably contains a humectant.

Suitable humectants include triacetin, N-methyl-2-pyrrolidone, 2-pyrrolidone, glycerol, urea, thiourea, ethylene urea, alkyl urea, alkyl thiourea, dialkyl urea and dialkyl thiourea, diols, including ethanediols, propanediols, propanetriols, butanediols, pentanediols, and hexanediols. Preferred humectants are 2-pyrrolidone, glycerol and 1,2-hexanediol, the latter were found to be the most effective for improving inkjet printing reliability in an industrial environment.

The humectant is preferably added to the inkjet ink formulation in an amount of 0.1 to 35 wt % of the formulation, more preferably 1 to 30 wt % of the formulation, and most preferably 3 to 25 wt % of the formulation.

pH-Adjusters

The aqueous inkjet ink may contain at least one pH adjuster. Suitable pH adjusters include NaOH, KOH, $NEt_3$, $NH_3$, HCl, $HNO_3$, $H_2SO_4$ and (poly)alkanolamines such as triethanol amine and 2-amino-2-methyl-1-propanol. Preferred pH adjusters are triethanol amine, NaOH and $H_2SO_4$.

The pH is preferably adjusted to a value between 7.5 and 10.0, more preferably between 8.0 and 9.0; the latter pH range has been observed to result in an improved ink stability.

Preparation of Inkjet Inks

The one or more aqueous inkjet inks may be prepared by precipitating or milling the colour pigment in the dispersion medium in the presence of the polymeric dispersant, or simply by mixing a self-dispersible colour pigment in the ink.

Mixing apparatuses may include a pressure kneader, an open kneader, a planetary mixer, a dissolver, and a Dalton Universal Mixer. Suitable milling and dispersion apparatuses are a ball mill, a pearl mill, a colloid mill, a high-speed disperser, double rollers, a bead mill, a paint conditioner, and triple rollers. The dispersions may also be prepared using ultrasonic energy.

If the inkjet ink contains more than one pigment, the colour ink may be prepared using separate dispersions for each pigment, or alternatively several pigments may be mixed and co-milled in preparing the dispersion.

The dispersion process can be carried out in a continuous, batch or semi-batch mode.

The preferred amounts and ratios of the ingredients of the mill grind will vary widely depending upon the specific materials and the intended applications. The contents of the milling mixture comprise the mill grind and the milling media. The mill grind comprises pigment, dispersant and a liquid carrier such as water. For aqueous ink-jet inks, the pigment is usually present in the mill grind at 1 to 50 wt %, excluding the milling media. The weight ratio of pigment over dispersant is preferably 20:1 to 1:2.

The milling time can vary widely and depends upon the pigment, selected mechanical means and residence conditions, the initial and desired final particle size, etc. In the present invention pigment dispersions with an average particle size of less than 100 nm may be prepared.

After milling is completed, the milling media is separated from the milled particulate product (in either a dry or liquid dispersion form) using conventional separation techniques, such as by filtration, sieving through a mesh screen, and the like. Often the sieve is built into the mill, e.g. for a bead mill. The milled pigment concentrate is preferably separated from the milling media by filtration.

In general, it is desirable to make the colour ink in the form of a concentrated mill grind, which is subsequently diluted to the appropriate concentration for use in the ink-jet printing system. This technique permits preparation of a greater quantity of pigmented ink from the equipment. If the mill grind was made in a solvent, it is diluted with water and optionally other solvents to the appropriate concentration. If it was made in water, it is diluted with either additional water or water miscible solvents to make a mill grind of the desired concentration. By dilution, the ink is adjusted to the desired viscosity, colour, hue, saturation density, and print area coverage for the particular application. Viscosity can also be adjusted by using low molecular weight polyethylene glycols, for example having an average numerical molecular weight between 200 and 800. An example is PEG 200 from CLARIANT.

Decorative Panels

The decorative panels are preferably selected from the group consisting of kitchen panels, flooring panels, furniture panels, ceiling panels and wall panels.

A decorative panel, illustrated by a flooring panel having also a tongue and groove join in FIG. 1, includes preferably at least a core layer, a decorative layer and a protective layer. In order to protect the colour image of the decorative layer against wear, a protective layer is applied on top of the decorative layer. A balancing layer may also be applied at the opposite side of the core layer to restrict or prevent possible bending of the decorative panel. The assembly into a decorative panel of the balancing layer, the core layer, the decorative layer and the protective layer is preferably performed in the same press treatment of preferably a DPL process (Direct Pressure Laminate).

In a preferred embodiment of decorative panels, tongue and groove profiles are milled into the side of individual decorative panels which allow them to be slid into one another. The tongue and grove join ensures, in the case of flooring panels, a sturdy floor construction and protects the floor, preventing dampness from penetrating.

In a more preferred embodiment, the decorative panels include a tongue and a groove of a special shape, which allow them to be clicked into one another. The advantage thereof is an easy assembly requiring no glue. The shape of the tongue and groove necessary for obtaining a good mechanical join is well-known in the art of laminate flooring, as also exemplified in EP 2280130 A (FLOORING IND), WO 2004/053258 (FLOORING IND), US 2008010937 (VALINGE) and U.S. Pat. No. 6,418,683 (PERSTORP FLOORING).

The tongue and groove profiles are especially preferred for flooring panels and wall panels, but in the case of furniture panels, such tongue and groove profile is preferably absent for aesthetical reasons of the furniture doors and drawer fronts. However, a tongue and groove profile may be used to click together the other panels of the furniture, as illustrated by US 2013071172 (UNILIN).

The decorative panels, may further include a sound-absorbing layer as disclosed by U.S. Pat. No. 8,196,366 (UNILIN).

In a preferred embodiment, the decorative panel is an antistatic layered panel. Techniques to render decorative panels antistatic are well-known in the art of decorative surfaces as exemplified by EP 1567334 A (FLOORING IND).

The top surface of the decorative panel is preferably provided with a relief matching the colour image, such as for example the wood grain, cracks and nuts in a woodprint. Embossing techniques to accomplish such relief are well-known and disclosed by, for example, EP 1290290 A (FLOORING IND), US 2006144004 (UNILIN), EP 1711353 A (FLOORING IND) and US 2010192793 (FLOORING IND).

In a preferred embodiment, the decorative panels are made in the form of rectangular oblong strips. The dimensions thereof may vary greatly. Preferably the panels have a length exceeding 1 meter, and a width exceeding 0.1 meter, e.g. the panels can be about 1.3 meter long and about 0.15 meter wide. According to a special embodiment the length of the panels exceeds 2 meter, with the width being preferably about 0.2 meter or more. The print of such panels is preferably free form repetitions.

Core Layers

The core layer is preferably made of wood-based materials, such as particle board, MDF or HDF (Medium Density Fibreboard or High Density Fibreboard), Oriented Strand Board (OSB) or the like. Use can also be made of boards of synthetic material or boards hardened by means of water, such as cement boards. In a particularly preferred embodiment, the core layer is a MDF or HDF board.

The core layer may also be assembled at least from a plurality of paper sheets, or other carrier sheets, impregnated with a thermosetting resin as disclosed by WO 2013/050910 (UNILIN). Preferred paper sheets include so-called Kraft paper obtained by a chemical pulping process also known as the Kraft process, e.g. as described in U.S. Pat. No. 4,952,277 (BET PAPERCHEM).

In another preferred embodiment, the core layer is a board material composed substantially of wood fibres, which are bonded by means of a polycondensation glue, wherein the polycondensation glue forms 5 to 20 percent by weight of the board material and the wood fibres are obtained for at least 40 percent by weight from recycled wood. Suitable examples are disclosed by EP 2374588 A (UNILIN).

Instead of a wood based core layer, also a synthetic core layer may be used, such as those disclosed by US 2013062006 (FLOORING IND). In a preferred embodiment, the core layer comprises a foamed synthetic material, such as foamed polyethylene or foamed polyvinyl chloride.

Other preferred core layers and their manufacturing are disclosed by US 2011311806 (UNILIN) and U.S. Pat. No. 6,773,799 (DECORATIVE SURFACES).

The thickness of the core layer is preferably between 2 and 12 mm, more preferably between 5 and 10 mm.

Paper Substrates

The decorative layer and preferably also the protective layer and the optional balancing layer, include paper as substrate.

The paper preferably has a weight of less than 150 g/m$^2$, because heavier paper sheets are hard to impregnate all through their thickness with a thermosetting resin. Preferably said paper layer has a paper weight, i.e. without taking into account the resin provided on it, of between 50 and 100 g/m$^2$ and possibly up to 130 g/m$^2$. The weight of the paper cannot be too high, as then the amount of resin needed to sufficiently impregnate the paper would be too high, and reliably further processing the printed paper in a pressing operation becomes badly feasible.

Preferably, the paper sheets have a porosity according to Gurley's method (DIN 53120) of between 8 and 20 seconds. Such porosity allows even for a heavy sheet of more than 150 g/m$^2$ to be readily impregnated with a relatively high amount of resin.

Suitable paper sheets having high porosity and their manufacturing are also disclosed by U.S. Pat. No. 6,709,764 (ARJO WIGGINS).

The paper for the decorative layer is preferably a white paper and may include one or more whitening agents, such as titanium dioxide, calcium carbonate and the like. The presence of a whitening agent helps to mask differences in colour on the core layer, which can cause undesired colour effects on the colour image.

Alternatively, the paper for the decorative layer is preferably a bulk coloured paper including one or more colour dyes and/or colour pigments. Besides the masking of differences in colour on the core layer, the use of a coloured paper reduces the amount of inkjet ink required to print the colour image. For example, a light brown or grey paper may be used for printing a wood motif as colour image in order to reduce the amount of inkjet ink needed.

In a preferred embodiment, unbleached Kraft paper is used for a brownish coloured paper in the decorative layer. Kraft paper has a low lignin content resulting in a high tensile strength. A preferred type of Kraft paper is absorbent Kraft paper of 40 to 135 g/m$^2$ having high porosity, and made from clean low kappa hardwood Kraft of good uniformity.

If the protective layer includes a paper, then a paper is used which becomes transparent or translucent after resin impregnation so that the colour image in the decorative layer can be viewed.

The above papers may also be used in the balancing layer.

Ink Receiving Layers

One or more ink receiving layers are present on the paper substrate of the decorative layer for enhancing the image quality.

The ink receiving layer(s) may be a purely polymer based ink receiving layer, but preferably contain an inorganic pigment and a polymeric binder. The inorganic pigment may be a single type of inorganic pigment or a plurality of different inorganic pigments. The polymeric binder may be a single type of polymeric binder or a plurality of different polymeric binders.

In a preferred embodiment, the ink receiving layer(s) have a total dry weight between 2.0 g/m$^2$ and 10.0 g/m$^2$, more preferably between 3.0 and 6.0 g/m$^2$.

In a preferred embodiment, the ink receiving layer(s) include a polymeric binder selected from the group consisting of hydroxyethyl cellulose; hydroxypropyl cellulose; hydroxyethylmethyl cellulose; hydroxypropyl methyl cellulose; hydroxybutylmethyl cellulose; methyl cellulose; sodium carboxymethyl cellulose; sodium carboxymethylhydroxethyl cellulose; water soluble ethylhydroxyethyl cellulose; cellulose sulfate; polyvinyl alcohol; vinylalcohol copolymers; polyvinyl acetate; polyvinyl acetal; polyvinyl pyrrolidone; polyacrylamide; acrylamide/acrylic acid copolymer; polystyrene, styrene copolymers; acrylic or methacrylic polymers; styrene/acrylic copolymers; ethylene-vinylacetate copolymer; vinyl-methyl ether/maleic acid copolymer; poly(2-acrylamido-2-methyl propane sulfonic acid); poly(diethylene triamine-co-adipic acid); polyvinyl pyridine; polyvinyl imidazole; polyethylene imine epichlorohydrin modified; polyethylene imine ethoxylated; ether bond-containing polymers such as polyethylene oxide (PEO), polypropylene oxide (PPO), polyethylene glycol (PEG) and polyvinyl ether (PVE); polyurethane; melamine resins; gelatin; carrageenan; dextran; gum arabic; casein; pectin; albumin; chitins; chitosans; starch; collagen derivatives; collodion and agar-agar.

In a particularly preferred embodiment, the ink receiving layer(s) include a polymeric binder, preferably a water soluble polymeric binder (>1 g/L water at 25° C.), which has a hydroxyl group as a hydrophilic structural unit, e.g. a polyvinyl alcohol.

A preferred polymer for the ink receiving layer(s) is a polyvinylalcohol (PVA), a vinylalcohol copolymer or modified polyvinyl alcohol. The modified polyvinyl alcohol may be a cationic type polyvinyl alcohol, such as the cationic polyvinyl alcohol grades from Kuraray, such as POVAL C506, POVAL C118 from Nippon Goshei.

The pigment in the ink receiving layer(s) is an inorganic pigment, which can be chosen from neutral, anionic and cationic pigment types. Useful pigments include e.g. silica, talc, clay, hydrotalcite, kaolin, diatomaceous earth, calcium carbonate, magnesium carbonate, basic magnesium carbonate, aluminosilicate, aluminum trihydroxide, aluminum oxide (alumina), titanium oxide, zinc oxide, barium sulfate, calcium sulfate, zinc sulfide, satin white, alumina hydrate such as boehmite, zirconium oxide or mixed oxides.

The inorganic pigment is preferably selected from the group consisting of alumina hydrates, aluminum oxides, aluminum hydroxides, aluminum silicates, and silicas.

Particularly preferred inorganic pigments are silica particles, colloidal silica, alumina particles and pseudo-boehmite, as they form better porous structures. When used herein, the particles may be primary particles directly used as they are, or they may form secondary particles. Preferably, the particles have an average primary particle diameter of 2 μm or less, and more preferably 200 nm or less.

A preferred type of alumina hydrate is crystalline boehmite, or γ-AlO(OH). Useful types of boehmite include DISPERAL HP14, DISPERAL 40, DISPAL 23N4-20, DISPAL 14N-25 and DISPERAL AL25 from Sasol; and MARTOXIN VPP2000-2 and GL-3 from Martinswerk GmbH.

Useful cationic aluminum oxide (alumina) types include α-$Al_2O_3$ types, such as NORTON E700, available from Saint-Gobain Ceramics & Plastics, Inc, and γ-$Al_2O_3$ types, such as ALUMINUM OXID C from Degussa.

Other useful inorganic pigments include aluminum trihydroxides such as Bayerite, or α-$Al(OH)_3$, such as PLURAL BT, available from Sasol, and Gibbsite, or γ-$Al(OH)_3$, such as MARTINAL grades and MARTIFIN grades from Martinswerk GmbH, MICRAL grades from JM Huber company; HIGILITE grades from Showa Denka K.K.

Another preferred type of inorganic pigment is silica, which can be used as such, in its anionic form or after cationic modification. The silica can be chosen from different types, such as crystalline silica, amorphous silica, precipitated silica, fumed silica, silica gel, spherical and non-spherical silica. The silica may contain minor amounts of metal oxides from the group Al, Zr, Ti. Useful types include AEROSIL OX50 (BET surface area 50±15 m$^2$/g, average primary particle size 40 nm, $SiO_2$ content >99.8%, $Al_2O_3$ content <0.08%), AEROSIL MOX170 (BET surface area 170 g/m$^2$, average primary particle size 15 nm, $SiO_2$ content >98.3%, $Al_2O_3$ content 0.3-1.3%), AEROSIL MOX80 (BET surface area 80±20 g/m$^2$, average primary particle size 30 nm, $SiO_2$ content >98.3%, $Al_2O_3$ content 0.3-1.3%), or other hydrophilic AEROSIL grades available from Degussa-Hüls AG, which may give aqueous dispersions with a small average particle size (<500 nm).

Generally depending on their production method, silica particles are grouped into two types, wet-process particles and dry-process (vapour phase-process or fumed) particles.

In the wet process, active silica is formed through acidolysis of silicates, and this is polymerized to a suitable degree and flocculated to obtain hydrous silica.

A vapour-phase process includes two types; one includes high-temperature vapour-phase hydrolysis of silicon halide to obtain anhydrous silica (flame hydrolysis), and the other includes thermal reduction vaporization of silica sand and coke in an electric furnace followed by oxidizing it in air to also obtain anhydrous silica (arc process). The "fumed silica" means to indicate anhydrous silica particles obtained in the vapour-phase process.

For the silica particles used in the invention, especially preferred are the fumed silica particles. The fumed silica differs from hydrous silica in point of the density of the surface silanol group and of the presence or absence of pores therein, and the two different types of silica have different properties. The fumed silica is suitable for forming a three-dimensional structure of high porosity. Since the fumed silica has a particularly large specific surface area, its ink absorption and retention are high. Preferably, the vapour-phase silica has an average primary particle diameter of 30 nm or less, more preferably 20 nm or less, even more preferably 10 nm or less, and most preferably from 3 to 10 nm. The fumed silica particles readily aggregate through hydrogen bonding at the silanol groups therein. Therefore, when their mean primary particle size is not larger than 30 nm, the silica particles may form a structure of high porosity.

In a further preferred embodiment, said ink receiving layer can be further crosslinked. Any suitable crosslinker known in the prior art can be used. Boric acid is particularly preferred as crosslinker for the ink receiving layer according to the present invention.

The ink receiving layer(s) may include other additives, such as colorants, surfactants, biocides, antistatic agents, hard particles for wear resistance, elastomers, UV absorbers, organic solvents, plasticizers, light-stabilizers, pH adjusters, antistatic agents, whitening agents, matting agents and the like.

The ink receiving layer(s) may consist of a single layer or of two, three or more layers even having a different composition.

The ink receiving layer(s) can be coated onto the support by any conventional coating technique, such as dip coating, knife coating, extrusion coating, spin coating, slide hopper coating and curtain coating.

Alternatively, the ink receiving layer(s) can also be applied by a printing technique, such as flexographic printing, screen printing and inkjet printing. The inkjet printer preferably employs valvejet printing heads.

Thermosetting Resins

The thermosetting resin is preferably selected from the group consisting of melamine-formaldehyde based resins, ureum-formaldehyde based resins and phenol-formaldehyde based resins.

Other suitable resins for impregnating the paper are listed in [0028] of EP 2274485 A (HUELSTA).

Most preferably the thermosetting resin is a melamine-formaldehyde based resin, often simply referred to in the art as a 'melamine (based) resin'.

The melamine formaldehyde resin preferably has a formaldehyde to melamine ratio of 1.4 to 2. Such melamine based resin is a resin that polycondensates while exposed to heat in a pressing operation. The polycondensation reaction creates water as a by-product. It is particularly with these kinds of thermosetting resins, namely those creating water as a by-product, that the present invention is of interest. The created water, as well as any water residue in the thermosetting resin before the pressing, must leave the hardening resin layer to a large extent before being trapped and leading to a loss of transparency in the hardened layer. The available ink layer can hinder the diffusion of the vapour bubbles to the surface, resulting in adhesion problems.

The paper is preferably provided with an amount of thermosetting resin equalling 40 to 250% dry weight of resin as compared to weight of the paper. Experiments have shown that this range of applied resin provides for a sufficient impregnation of the paper, that avoids splitting to a large extent, and that stabilizes the dimension of the paper to a high degree.

The paper is preferably provided with such an amount of thermosetting resin that at least the paper core is satisfied with the resin. Such satisfaction can be reached when an amount of resin is provided that corresponds to at least 1.5 or at least 2 times the paper weight.

Preferably the resin provided on said paper is in a so-called B-stage. Such B-stage exists when the thermosetting resin is not completely cross linked.

Preferably the resin provided on said paper has a relative humidity lower than 15%, and still better of 10% by weight or lower.

Preferably the step of providing said paper with thermosetting resin involves applying a mixture of water and the resin on the paper. The application of the mixture might involve immersion of the paper in a bath of the mixture and/or spraying or jetting the mixture. Preferably the resin is provided in a dosed manner, for example by using one or more squeezing rollers and/or doctor blades to set the amount of resin added to the paper layer.

Methods for impregnating a paper substrate with resin are well-known in the art as exemplified by WO 2012/126816 (VITS) and EP 966641 A (VITS).

The dry resin content of the mixture of water and resin for impregnation depends on the type of resin. An aqueous solution containing a phenol-formaldehyde resin preferably has a dry resin content of about 30% by weight, while an aqueous solution containing a melamine-formaldehyde resin preferably has a dry resin content of about 60% by weight. Methods of impregnation with such solutions are disclosed by e.g. U.S. Pat. No. 6,773,799 (DECORATIVE SURFACES).

The paper is preferably impregnated with the mixtures known from U.S. Pat. No. 4,109,043 (FORMICA CORP) and U.S. Pat. No. 4,112,169 (FORMICA CORP), and hence preferably comprise, next to melamine formaldehyde resin, also polyurethane resin and/or acrylic resin.

The mixture including the thermosetting resin may further include additives, such as colorants, surface active ingredients, biocides, antistatic agents, hard particles for wear resistance, elastomers, UV absorbers, organic solvents, acids, bases, and the like.

Antistatic agents may be used in thermosetting resin. However preferably antistatic agents, like NaCl and KCl, carbon particles and metal particles, are absent in the resin, because often they have undesired side effects such as a lower water resistance or a lower transparency. Other suitable antistatic agents are disclosed by EP 1567334 A (FLOORING IND).

Hard particles for wear resistance are preferably included in a protective layer.

Decorative Layers

The decorative layer includes a thermosetting resin impregnated paper and a colour image printed thereon by inkjet. In the assembled decorative panel, the colour image is located on the resin impregnated paper on the opposite side than the side facing the core layer.

A decorative panel, like a floor panel, preferably has on one side of the core layer a decorative layer and a balancing layer on the other side of the core layer. However, a decorative layer may be applied on both sides of the core layer. The latter is especially desirable in the case of laminate panels for furniture. In such a case, preferably also a protective layer is applied on both decorative layers present on both sides of the core layer.

A colour image is obtained by jetting and drying one or more aqueous inkjet inks of an aqueous inkjet ink set upon the one or more ink receiving layers.

There is no real restriction on the content of the colour image. The colour image may also contain information such as text, arrows, logo's and the like. The advantage of inkjet printing is that such information can be printed at low volume without extra cost, contrary to gravure printing.

In a preferred embodiment, the colour image is a wood reproduction or a stone reproduction, but it may also be a fantasy or creative image, such as an ancient world map or a geometrical pattern, or even a single colour for making, for example, a floor consisting of black and red tiles or a single colour furniture door.

An advantage of printing a wood colour image is that a floor can be manufactured imitating besides oak, pine and beech, also very expensive wood like black walnut which would normally not be available for house decoration.

An advantage of printing a stone colour image is that a floor can be manufactured which is an exact imitation of a stone floor, but without the cold feeling when walking barefooted on it.

Protective Layers

A protective layer is applied above the printed colour image after printing, e.g. by way of an overlay, i.e. a resin provided carrier, or a liquid coating, preferably while the decor layer is laying on the core layer, either loosely or already connected or adhered thereto.

In a preferred embodiment, the carrier of the overlay is a paper impregnated by a thermosetting resin that becomes transparent or translucent after heat pressing in a DPL process.

A preferred method for manufacturing such an overlay is described in US 2009208646 (DEKOR-KUNSTSTOFFE).

The liquid coating includes preferably a thermosetting resin, but may also be another type of liquid such as a UV- or an EB-curable varnish.

In a particularly preferred embodiment, the liquid coating includes a melamine resin and hard particles, like corundum.

The protective layer is preferably the outermost layer, but in another embodiment a thermoplastic or elastomeric surface layer may be coated on the protective layer, preferably of pure thermoplastic or elastomeric material. In the latter case, preferably a thermoplastic or elastomeric material based layer is also applied on the other side of the core layer.

Liquid melamine coatings are exemplified in DE 19725289 C (ITT MFG ENTERPRISES) and U.S. Pat. No. 3,173,804 (RENKL PAIDIWERK).

The liquid coating may contain hard particles, preferably transparent hard particles. Suitable liquid coatings for wear protection containing hard particles and methods for manufacturing such a protective layer are disclosed by US 2011300372 (CT FOR ABRASIVES AND REFRACTORIES) and U.S. Pat. No. 8,410,209 (CT FOR ABRASIVES AND REFRACTORIES).

The transparency and also the colour of the protective layer can be controlled by the hard particles, when they comprise one or a plurality of oxides, oxide nitrides or mixed oxides from the group of elements Li, Na, K, Ca, Mg, Ba, Sr, Zn, Al, Si, Ti, Nb, La, Y, Ce or B.

The total quantity of hard particles and transparent solid material particles is typically between 5% by volume and 70% by volume, based on the total volume of the liquid coating. The total quantity of hard particles is between 1 $g/m^2$ and 100 $g/m^2$, preferably 2 $g/m^2$ to 50 $g/m^2$.

If the protective layer includes a paper as carrier sheet for the thermosetting resin, then the hard particles, such as aluminium oxide particles, are preferably incorporated in or on the paper. Preferred hard particles are ceramic or mineral particles chosen from the group of aluminium oxide, silicon carbide, silicon oxide, silicon nitride, tungsten carbide, boron carbide, and titanium dioxide, or from any other metal oxide, metal carbide, metal nitride or metal carbonitride. The most preferred hard particles are corundum and so-called Sialon ceramics. In principle, a variety of particles may be used. Of course, also any mixture of the above-mentioned hard particles may be applied.

The amount of hard particles in the protective layer may be determined in function of the desired wear resistance, preferably by a so-called Taber test as defined in EN 13329 and also disclosed in WO 2013/050910 A (UNILIN) and U.S. Pat. No. 8,410,209 (CT FOR ABRASIVES AND REFRACTOR).

Hard particles having an average particle size of between 1 and 200 μm are preferred. Preferably an amount of such particles of between 1 and 40 $g/m^2$ is applied above the printed image. An amount lower than 20 $g/m^2$ can suffice for the lower qualities.

If the protective layer includes a paper, then it preferably has a paper weight of between 10 and 50 $g/m^2$. Such a paper is often also referred to as a so-called overlay commonly used in laminate panels. Preferred methods for manufacturing such an overlay are disclosed by WO 2007/144718 (FLOORING IND).

Preferably the step of providing the protective layer of thermosetting resin above the printed image involves a press treatment. Preferably a temperature above 150° C. is applied in the press treatment, more preferably between 180° and 220° C., and a pressure of more than 20 bar, more preferably between 35 and 40 bar.

In a preferred embodiment, the decorative panel is manufactured using two press treatments, because this results in an extremely high abrasion resistance. Indeed, during the first press treatment, preferably the layers immediately underlying the wear resistant protective layer are substantially or wholly cured. The hard particles comprised in the wear resistant protective layer are thereby prevented from being pushed down out of the top area of the floor panel into the colour image or below the colour image and stay in the zone where they are most effective, namely essentially above the colour image. This makes it possible to reach an initial wear point according to the Taber test as defined in EN 13329 of over 10000 rounds, where in one press treatment of layers with the same composition only just over 4000 rounds were reached. It is clear that the use of two press treatments as defined above, leads to a more effective use of available hard particles. An alternative advantage of using at least two press treatments lays in the fact that a similar wearing rate, as in the case where a single press treatment is used, can be obtained with less hard particles if the product is pressed twice. Lowering the amount of hard particles is interesting, since hard particles tend to lower the transparency of the wear resistant protective layer, which is undesirable. It becomes also possible to work with hard particles of smaller diameter, e.g. particles having an average particle diameter of 15 μm or less, or even of 5 μm or less.

Balancing Layers

The main purpose of the balancing layer(s) is to compensate tensile forces by layers on the opposite side of the core layer, so that an essentially flat decorative panel is obtained. Such a balancing layer is preferably a thermosetting resin layer, that can comprise one or more carrier layers, such as paper sheets.

As already explained above for a furniture panel, the balancing layer(s) may be a decorative layer, optionally complemented by a protective layer.

Instead of one or more transparent balancing layers, also an opaque balancing layer may be used which gives the decorative panel a more appealing look by masking surface irregularities. Additionally, it may contain text or graphical information such as a company logo or text information.

Methods of Manufacturing Decorative Panels

A method of manufacturing a decorative panels includes the method of inkjet printing as described above.

In a preferred embodiment of the method for manufacturing decorative panels, the resin impregnated decorative layer is heat pressed between a core layer and a protective layer and cut into a decorative panel selected from the group consisting of flooring, kitchen, furniture and wall panels.

In a preferred embodiment of the method for manufacturing decorative panels, the decorative panel includes a tongue and a groove capable of achieving a glue less mechanical join between decorative panels.

Preferably the inkjet printing method of the invention is part of a DPL process, wherein the decorative layer is taken up in a stack to be pressed with the core layer and a protective layer, and preferably also a balancing layer. It is of course not excluded that the method of the invention would form part of a CPL (Compact Laminate) or an HPL (High Pressure Laminate) process in which the decorative layer is hot pressed at least with a plurality of resin impregnated core paper layers, e.g. of so called Kraft paper, forming a substrate underneath the decorative layer, and wherein the obtained pressed and cured laminate layer, or laminate board is, in the case of an HPL, glued to a further substrate, such as to a particle board or an MDF or HDF board.

In a preferred embodiment, a protective layer containing a thermosetting resin is applied onto the inkjet printed colour image, wherein the thermosetting resin may be a colored thermosetting resin to reduce the amount of inkjet ink to be printed.

The method of manufacturing a decorative surface preferably includes providing a relief in at least the protective layer, more preferably by means of a short cycle embossing press. The embossing preferably takes place at the same time that the core layer, the decorative layer and the protective layer, and preferably also one or more balancing layers, are pressed together. The relief in the protective layer preferably corresponds to the colour image.

Preferably the relief comprises portions that have been embossed over a depth of more than 0.5 mm, or even more than 1 mm, with respect to the global upper surface of the decorative panel. The embossments may extend into the decorative layer.

The balancing layer of a decorative panel is preferably planar. However, a relief might be applied in the balancing layer(s) for improving gluing down of the panels and/or for improved slip resistance and/or for improved, i.e. diminished, sound generation or propagation.

It should be clear that the use of more than one press treatment is also advantageous for the manufacturing of decorative surfaces. Such technique could be used for the manufacturing of any panel that comprises on the one hand a wear resistant protective layer on the basis of a thermosetting synthetic material, possibly a carrier sheet such as paper, and hard particles, and, on the other hand, one or more layers underlying the wear resistant protective layer on the basis of thermosetting synthetic material. The underlying layers may comprise a decorative layer, such as an inkjet printed paper provided with thermosetting resin. As a core layer, such panel might essentially comprise a board material with a density of more than 500 kg/m³, such as an MDF or HDF board material. The manufacturing panels with a plurality of press treatments is preferably put in practice with the so-called DPL panels (Direct Pressure Laminate). In the latter case, during a first press treatment, at least the decorative layer provided with thermosetting resin, is cured and attached to the core material, preferably an MDF or HDF board material, whereby a whole is obtained of at least the decorative layer and the board material, and possibly a balancing layer at the side of the board opposite the decor layer. During a second press treatment, the wear resistant layer is cured and attached to the obtained whole.

In another embodiment, the method for manufacturing a decorative surface uses the inkjet printing method according to the present invention in combination with the methodology disclosed by US 2011008624 (FLOORING IND), wherein the protective layer includes a substance that hardens under the influence of ultraviolet light or electron beams.

Inkjet Printing Devices

The one or more aqueous inkjet inks may be jetted by one or more print heads ejecting small droplets in a controlled manner through nozzles onto a substrate, which is moving relative to the print head(s).

A preferred print head for the inkjet printing system is a piezoelectric head. Piezoelectric inkjet printing is based on the movement of a piezoelectric ceramic transducer when a voltage is applied thereto. The application of a voltage changes the shape of the piezoelectric ceramic transducer in the print head creating a void, which is then filled with ink. When the voltage is again removed, the ceramic expands to its original shape, ejecting a drop of ink from the print head. However, the inkjet printing method according to the present invention is not restricted to piezoelectric inkjet printing. Other inkjet print heads can be used and include various types, such as a continuous type.

In a multi-pass inkjet printing process, the inkjet print head scans back and forth in a transversal direction across the moving ink-receiver surface. Sometimes the inkjet print head does not print on the way back. Bi-directional printing is preferred for obtaining a high area throughput. Another preferred printing method is by a "single pass printing process", which can be performed by using page wide inkjet print heads or multiple staggered inkjet print heads, which cover the entire width of the ink-receiving surface. In a single pass printing process the inkjet print heads usually remain stationary and the substrate surface is transported under the inkjet print heads.

EXAMPLES

Materials

All materials used in the following examples were readily available from standard sources such as Aldrich Chemical Co. (Belgium) and Acros (Belgium) unless otherwise specified. Where used, water is demineralised water.

PB15:3 is an abbreviation used for Hostaperm™ B4G-KR, a C.I. Pigment Blue 15:3 pigment from CLARIANT.

PR254 is the abbreviation for C.I. Pigment Red 254 for which Irgazin™ DPP Red BTR from Ciba Specialty Chemicals was used.

PY150 is an abbreviation used for Fanchon™ Yellow 150:B022, a C.I. Pigment Yellow 150 from SUN CHEMICAL.

PY151 is an abbreviation used for INK JET H4G LV 3853, a C.I. Pigment Yellow 151 from CLARIANT.

PBL7 is an abbreviation used for Printex™ 90, a carbon black pigment from EVONIK.

Edaplan is an abbreviation used for Edaplan™ 482, a polymeric dispersant from MUNZING.

Dispex is an abbreviation used for the acrylic block copolymer dispersant available as Dispex™ Ultra PX 4575 (40% aqueous solution) from BASF.

PEG 200 is a polyethylene glycol having an average molecular weight of 200 from CLARIANT.

TEA is triethanol amine.

Proxel is an abbreviation used for a 5% aqueous solution of 1,2-benzisothiazolin-3-one available as Proxel™ K from YDS CHEMICALS NV.

TIVIDATMFL2500 is a solution of 30-35% of an anionic fluorosurfactant in 1-methoxy-2-propanol from MERCK.

MPK9653 is a décor paper available as Technocell™ premium MPK9653-100 from FELIX SCHOELLER GROUP.

MPK9669 is a décor paper available as Technocell™ standard MPK9669-095 from FELIX SCHOELLER GROUP.

GRAVYEL is an abbreviation used for the rotogravure ink Arcolor™ Yellow available from ARCOLOR.

Measurement Methods

1. CIELAB Parameters

The reflectance spectrum of each sample was measured three times with a Gretag SPM50 spectrophotometer in the range from 380 up to 730 nm in steps of 10 nm.

Unless otherwise specified, the CIE L* a* b* coordinates as well as chroma C* and hue angle H* were calculated for a 2° observer and a D50 light source.

2. Metameric Index MI

In the CIELAB colour space, a colour is defined using three terms L*, a*, and b*. L* defines the lightness of a colour, and it ranges from zero (black) to 100 (white). The terms a* and b*, together, define the hue. The term a* ranges from a negative number (green) to a positive number (red). The term b* ranges from a negative number (blue) to a positive number (yellow). Additional terms such as hue angle H* and chroma C* are used to further describe a given colour, wherein:

$$H^* = \tan^{-1}(b^*/a^*) \quad \text{equation 1}$$

$$C^* = (a^{*2} + b^{*2})^{1/2} \quad \text{equation 2}$$

In the CIELAB colour space, ΔE* defines the "colour-distance", i.e. the difference between two colours, such as the colour of the original printed image and the colour of the same image after light fading. The higher the ΔE* number, the more difference between the two colours:

$$\Delta E^* = (\Delta L^{*2} + \Delta a^{*2} + \Delta b^{*2})^{1/2} \quad \text{equation 3.}$$

The CIE 1994 Colour Difference Model provided an improved calculation of the colour difference by including some weighing factors. The colour difference measured under the new model is indicated by ΔE94.

$$\Delta E^*_{94} = \sqrt{\left(\frac{\Delta L^*}{K_L}\right)^2 + \left(\frac{\Delta C^*}{1 + K_1 C_1^*}\right)^2 + \left(\frac{\Delta H^*}{1 + K_2 C_1^*}\right)^2}, \quad \text{equation 4}$$

wherein:

$$\Delta L^* = L^*_1 - L^*_2, \ C^*_1 = \sqrt{a^{*2}_1 + b^{*2}_1}, \ C^*_2 = \sqrt{a^{*2}_2 + b^{*2}_2},$$

$$\Delta C^* = C^*_1 - C^*_2, \ \Delta a^* = a^*_1 - a^*_2, \ \Delta b^* = b^*_1 - b^*_2 \text{ and}$$

$$\Delta H^* = \sqrt{\Delta E^{*2} - \Delta L^{*2} - \Delta C^{*2}} = \sqrt{\Delta a^{*2} + \Delta b^{*2} - \Delta C^{*2}}$$

and where the weighting factors depend on the application. For decoration applications: $K_L = 1$, $K_1 = 0.045$ and $K_2 = 0.015$.

For metamerism, two materials are considered. For example, in case of deco printing of wood colours, the first (or reference) material could be a piece of natural wood of some kind or a kitchen cabinet door, produced with rotogravure techniques. The second material may be the best possible reproduction of that first material by means of inkjet printing.

The reflectance spectrum of both materials is calculated for a selected set of light sources out of a list of 19 light sources:

Equi-energetic light source: CIE illuminant E
Daylight: D50, D55, D65
CIE standard illuminants: A (tungsten filament), B (direct daylight), C (shady daylight)
Fluorescent: CIE F-series F1 up to F12

The reflectance spectrum of each sample was measured three times with a Gretag SPM50 spectrophotometer in the range from 380 up to 730 nm in steps of 10 nm. Calculation involved the reflectance spectrum of the material in combination with the light source spectrum. The CIE L* a* b* coordinates for a 2° observer as well as chroma C* and hue angle H* were calculated for each material and for each light source.

For each light source, the difference values for ΔL*, Δa*, Δb*, ΔC*, ΔH* and the colour-distance ΔE*94 were calculated for the two materials, i.e. the reference material and the printed material, which thus delivered 19 sets of difference values for each reference sample and inkjet printed material. Simple descriptive statistics on the 19 sets of difference values was calculated.

The metameric index for the 2 materials was defined as three times the standard deviation of ΔE*94. The smaller the metameric index, the less colour difference between the 2 materials will be seen when they are compared to each other whilst changing light source within the selected set of 19 light sources.

3. Surface Tension

The static surface tension of the aqueous inkjet inks was measured with a KRUSS tensiometer K9 from KRUSS GmbH, Germany at 25° C. after 60 seconds.

4. Viscosity

The viscosity of an inkjet ink was measured, using a Brookfield DV-II+ viscometer at 32° C. at a shear rate of 1,000 s$^{-1}$.

5. Average Particle Size

An ink sample is diluted with ethyl acetate to a pigment concentration of 0.002 wt %. The average particle size of pigment particles is determined with a Nicomp™ 30 Submicron Particle Analyzer based upon the principle of dynamic light scattering.

For good ink jet characteristics (jetting and print quality), the average particle size of the dispersed particles is preferably below 250 nm.

6. Ink Stability

The inkjet ink is considered a stable pigment dispersion if the average particle size did not increase by more than 15% after a heat treatment of 7 days at 60° C.

The inkjet ink is considered a stable pigment dispersion if the viscosity did not increase by more than 10% after a heat treatment of 7 days at 60° C.

7. Light Fastness

The light fastness was determined as the colour hue shift ΔE94* between a print sample measured one hour after printing and the same print after 12 days exposure to Xenon light in a Atlas Xenotest™ 150S at an irradiance of 300-800 nm at 1250 W/m2 performed indoor behind window glass.

A colour hue change ΔE94*-value of 1.00 is clearly visible to the naked eye.

8. Blue Wool Scale

The Blue Wool Scale was used as a measurement of light fastness on inkjet printed samples. The test originates from the textile industry, but has been adopted by the laminate flooring industry (see e.g. the website ww.eplf.com from the European Producers of Laminate Flooring).

Two identical samples were made. One was placed in the dark as the control and the other was placed in the equivalent of sunlight for a three-month period. A standard blue wool textile fading test card conform to the ISO 105-b01 standard was also placed in the same light conditions as the sample under test. The amount of fading of the sample was then assessed by comparison to the original colour.

A rating between 0 and 8 is awarded by identifying which one of the eight strips on the blue wool standard card has faded to the same extent as the sample under test. Zero denotes extremely poor colour fastness whilst a rating of eight is deemed not to have altered from the original and thus credited as being lightfast and permanent.

The flooring industry expects a laminate floor to have a rating on the blue wool scale of 6 or more.

9. Jetting Reliability

The jetting reliability was tested using a Ricoh Gen5 inkjet print head suitable for aqueous inkjet inks. All tests were performed at 32° C., 38 kHz, 1 DPD and 6 m/s. An evaluation was then made in accordance with criteria described in Table 2, which are the failing nozzles at the start of printing and after 10 minutes and the number of side shooters.

TABLE 2

| Evaluation | Failing Nozzles | Increase in Failing Nozzles | Side shooters |
|---|---|---|---|
| Excellent | <10 | 0-5 | <15 |
| Very good | 10-20 | 6-15 | 15-25 |
| Good | 20-30 | 15-25 | 25-45 |
| Bad | 30-50 | 25-30 | 45-65 |
| Unacceptable | >50 | >30 | >65 |

Example 1

This example illustrates an aqueous inkjet ink set which is suitable for printing colour images for flooring laminates and having sufficient reliability for industrial inkjet ink printing.

Preparation of Inkjet Ink Sets

For each inkjet ink, a concentrated aqueous pigment dispersion was made in the same manner by mixing a composition according to Table 3: 6 g of pigment powder, 6 g of the active dispersant and 0.16 g of Proxel were mixed into 31.6 g of water and introduced into a 100 mL plastic container. The container was filed with 160 g of 3 mm yttrium stabilized zirconia beads ("high wear resistant zirconia grinding media" from Tosoh). The container was sealed and placed on rotating rolls for 7 days. After milling, the dispersion is separated from the beads. The concentrated aqueous pigment dispersion DIS-1 served as the basis for the preparation of the inkjet inks.

TABLE 3

| Component | Concentration (wt %) |
|---|---|
| Pigment | 15.00 |
| Dispersant | 15.00 |
| Proxel | 0.02 |
| Water | to complete 100.00 wt % |

Each of the inkjet inks C, R, Y1, Y2 and K were prepared in the same manner by diluting the corresponding concentrated pigment dispersion with the other ink ingredients according to Table 4 expressed in wt % based on the total weight of the ink. The component TEA was used to obtain a desired pH between 8 and 9, while PEG200 was used to obtain a desired viscosity of about 10 mPa·s. Water was added to complete the ink to the desired pigment concentration. The comparative pigmented aqueous inkjet ink set is CRY1K, while the inventive pigmented aqueous inkjet ink set is CRY2K. The viscosity, surface tension and average particle size was determined for each inkjet ink and is given in Table 4.

TABLE 4

| wt % of ink ingredient | C | R | Y1 | Y2 | K |
|---|---|---|---|---|---|
| PB15:3 | 2.20 | — | — | — | — |
| PR254 | — | 2.70 | — | — | — |
| PY151 | — | — | 3.85 | — | — |
| PY150 | — | — | — | 3.85 | — |
| PBL7 | — | — | — | — | 3.00 |
| Edaplan | 2.20 | 2.70 | 3.85 | — | 3.00 |
| Dispex | — | — | — | 3.85 | — |
| Proxel | 0.22 | 0.22 | 0.22 | 0.22 | 0.22 |
| 1,2-hexanediol | 3.00 | 3.00 | 2.50 | 2.50 | 3.00 |
| Glycerine | 20.00 | 20.00 | 20.00 | 20.00 | 20.00 |
| PEG200 | 33.00 | 33.00 | 28.00 | 24.00 | 33.00 |
| Triethanolamine | 0.30 | 0.17 | 0.35 | 0.31 | 0.25 |
| TIVIDA ™ FL2500 | 0.32 | 0.38 | 0.31 | 0.31 | 0.30 |
| Water | 38.76 | 37.83 | 40.92 | 44.96 | 37.23 |
| Viscosity at 32° C. (mPa · s) | 9 | 10 | 10 | 9 | 10 |
| Surface Tension (mN/m) | 21 | 22 | 22 | 20 | 21 |
| Average particle size (nm) | 138 | 154 | 206 | 154 | 121 |
| L* | 63.3 | 58.9 | 92.0 | 89.8 | 27.3 |
| a* | −35.5 | 66.2 | −11.9 | −3.8 | 1.7 |
| b* | −46.2 | 28.7 | 64.6 | 71.6 | 2.5 |
| Chroma C* | 58.3 | 72.2 | 65.7 | 71.7 | 3.0 |
| Hue angle H* | 232.5 | 23.4 | 100.4 | 93.0 | 55.8 |

Evaluation and Results

Jetting Reliability

The jetting reliability of the yellow inkjet ink Y2 and the cyan inkjet ink C was compared after degassing of the inkjet inks. The results are shown in Table 5.

TABLE 5

| Criterion | Inkjet ink C | Inkjet ink Y2 |
|---|---|---|
| Failing nozzles at start | 2 | 2 |
| Failing nozzles after 10 minutes | 4 | 2 |
| Sideshooters after 10 minutes | 14 | 11 |

From Table 5, it should be clear that both inkjet inks exhibit excellent jetting reliability.

Ink Stability

The ink stability was tested by comparing the average particle size and the viscosity after a heat treatment of 1 week at 60° C. and for the yellow inkjet inks Y1 and Y2 also after a heat treatment of 1 week at 80° C. The results are shown in Table 6.

TABLE 6

| Inkjet Ink | Pigment | Average Particle Size | Viscosity at 32° C. |
|---|---|---|---|
| | | % Increase after 1 week at 60° C. | |
| C | PB15:3 | 0% | 0% |
| R | PR254 | 1% | 0% |
| Y1 | PY151 | 22% | 0% |
| Y2 | PY150 | 0% | 0% |
| K | PBL7 | 0% | 0% |
| | | % Increase after 1 week at 80° C. | |
| Y1 | PY151 | 103% | 13% |
| Y2 | PY150 | 0% | 0% |

It can be seen from Table 6 that the inkjet inks containing the yellow inkjet ink Y2 containing PY150 has a superior ink stability compared to the yellow inkjet ink Y1 containing PY151. Together with the inkjet inks C, R and K, which exhibit also good ink stability, an inkjet ink set CRY2K is provided for reliable printing in an industrial environment.
Light Fastness The yellow inkjet inks Y1 and Y2 and a rotogravure yellow ink GRAVYEL, commonly used in the laminate flooring industry, were coated at a wet layer thickness of 10 μm using a bar coater on two different décor papers MPK9653 and MPK9669. The coatings were air dried for 24 hours prior to the test of light fastness. The results for light fastness are shown in Table 7.

TABLE 7

| Sample | ΔE94*- value for substrate | |
|---|---|---|
| | MPK9653 | MPK9669 |
| Y1 | 0.12 | 0.14 |
| Y2 | 0.06 | 0.07 |
| GRAVYEL | 0.28 | 0.24 |

It can be seen from Table 7 that all samples exhibit excellent light fastness.

The light fastness of the yellow inkjet inks Y2 containing the C.I. Pigment Yellow 150 was also tested using the blue wool scale, which is the reference test commonly used in the laminate flooring industry for determining light fastness. The sample scored a blue wool scale of 8, which thus meets the expectations of the flooring industry as a minimum blue wool scale of 6 is required.

Metamerism

The yellow inkjet inks Y1 and Y2 and a rotogravure yellow ink GRAVYEL were coated at a wet layer thickness of 10 μm using a bar coater on two different décor papers MPK9653 and MPK9669. The coatings were air dried for 24 hours.

The samples coated with the rotogravure yellow ink GRAVYEL were taken as the reference materials for the yellow inkjet inks Y1 and Y2 coated on the corresponding décor papers. The metamerism index (MI) was then determined for all the samples. The result is represented as a ratio of the metamerism index of the yellow inkjet ink Y1 over the metamerism index of the yellow inkjet ink Y2 in Table 8.

TABLE 8

| Décor paper | Ratio of MI (Y1) over MI (Y2) |
|---|---|
| MPK9653 | 1.13 |
| MPK9669 | 1.39 |

From Table 8, it is immediately clear that the yellow inkjet ink Y2 has an improved metamerism effect compared to the yellow inkjet ink Y1, as the ratio of MI(Y1) over MI(Y2) is larger than 1. Inherently, the inkjet ink set CRY2K has also an improved metamerism effect compared to the inkjet ink set CRY1K.

Example 2

This example illustrates the manufacturing of decorative panels.
Manufacturing of Decorative Panels A decorative layer was obtained by printing a decorative wood pattern on a décor paper MPK9653 paper using the CRY2K inkjet ink set in Table 4 and a Jeti™ Tauro from AGFA GRAPHICS equipped with Ricoh Gen5 print heads at a head temperature of 32° C. The dry weight of the jetted ink was less than 1.0 g/m².

The printed deco paper was then impregnated with an aqueous solution containing 60 wt % of melamine-formaldehyde based resin and dried to a residual humidity of about 8 g/m2. It was found that homogenous impregnation was accomplished in a time frame acceptable for industrial manufacturing.

A similar assembly was made as shown in FIG. 1, wherein the prepared decorative layer was interposed between a HDF core and a protective layer of melamine-formaldehyde resin impregnated paper containing aluminium oxide for durability. The assembly was then heat pressed. The obtained floor laminate exhibited good quality.

REFERENCE SIGNS LIST

TABLE 9

| 1 Decorative panel |
| 2 Protective layer |
| 3 Outermost ink receiving layer |
| 4 Inner ink receiving layer |
| 5 Core layer |
| 6 Jetted and dried colour image |
| 7 Balancing layer |
| 8 Tongue |
| 9 Groove |

The invention claimed is:

1. An inkjet printing method for manufacturing decorative panels, the method comprising:
    a) providing a paper substrate including one or more ink receiving layers;
    b) jetting a color image with pigmented aqueous inkjet inks from a pigmented aqueous inkjet ink set on the paper substrate including one or more ink receiving layers; and
    c) drying the jetted color image,
    wherein the pigmented aqueous inkjet ink set consists of a red aqueous inkjet ink containing a red pigment selected from the group consisting of C.I. Pigment Red 254, C.I. Pigment Red 176, and mixed crystals thereof; a yellow aqueous inkjet ink containing a pigment C.I Pigment Yellow 150 or a mixed crystal thereof; a black aqueous inkjet ink containing a carbon black pigment; and optionally a cyan aqueous inkjet ink containing a β-copper phthalocyanine pigment,
    wherein the pigmented aqueous inkjet inks contain less than 1 wt % of surfactant with the wt % based on the total weight of the aqueous inkjet ink,
    wherein the pigmented aqueous inkjet inks are jetted at a jetting temperature between 25° C. and 35° C., and
    wherein the one or more ink receiving layers are applied by a coating technique selected from dip coating, knife coating, extrusion coating, spin coating, slide hopper coating, and curtain coating.

2. The inkjet printing method of claim 1, the method further comprising using a single pass printing process, wherein the inkjet print heads remain stationary and the paper substrate is transported under the inkjet print heads.

3. The inkjet printing method of claim 2, wherein the color image comprises a wood motif having wood nerves extending in the transport direction of the paper substrate including one or more ink receiving layers.

4. The inkjet printing method of claim 1, wherein the paper substrate includes multiple ink receiving layers and an outermost ink receiving layer which contains no inorganic pigment or an amount of inorganic pigment smaller than that of the one or more ink receiving layers located between the paper substrate and the outermost ink receiving layer.

5. The inkjet printing method of claim 4, wherein the inorganic pigment is selected from the group consisting of alumina hydrates, aluminum oxides, aluminum hydroxides, aluminum silicates, and silicas.

6. The inkjet printing method of claim 5, wherein the one or more ink receiving layers contain a polymeric binder selected from the group consisting of polyvinylalcohol, a vinylalcohol copolymer, and a modified polyvinyl alcohol.

7. The inkjet printing method of claim 1, wherein the red pigment is C.I. Pigment Red 254 or a mixed crystal thereof.

8. The inkjet printing method of claim 7, wherein the pigmented aqueous inkjet ink set includes the cyan aqueous inkjet ink.

9. The inkjet printing method of claim 1, wherein the pigmented aqueous inkjet inks have a static surface tension at 25° C. of no more than 28 mN·m.

10. The inkjet printing method of claim 1, wherein the viscosity of the aqueous inkjet inks at a temperature of 32° C. is between 5 mPa·s and 12 mPa·s at a shear rate of 1,000 $s^{-1}$.

11. The inkjet printing method of claim 1, wherein the paper substrate has a porosity according to Gurley's method (DIN 53120) of between 8 seconds and 20 seconds.

12. The inkjet printing method of claim 1, wherein the ink receiving layer(s) have a total dry weight between 2.0 g/m$^2$ and 10.0 g/m$^2$.

13. A method for manufacturing decorative panels including the inkjet printing method of claim 1, wherein the paper substrate having the jetted and dried color image is impregnated with a thermosetting resin.

14. The method for manufacturing decorative panels of claim 13, wherein the melamine formaldehyde resin has a formaldehyde to melamine ratio of 1.4 to 2.

15. The method for manufacturing decorative panels of claim 14, wherein the paper is provided with an amount of thermosetting resin equaling 40% to 250% dry weight of resin as compared to weight of the paper.

16. The method for manufacturing decorative panels of claim 13, wherein the impregnated paper substrate is heat pressed between a core layer and a protective layer and cut into a decorative panel selected from the group consisting of flooring, kitchen, furniture, and wall panels.

17. The method for manufacturing decorative panels of claim 14, wherein the decorative panel includes a tongue and a groove capable of achieving a glue less mechanical join between decorative panels.

18. A decorative panel obtained by the manufacturing method of claim 13, wherein the decorative panel is selected from the group consisting of flooring panels and furniture panels.

19. The decorative panel of claim 18, wherein the decorative panel includes, in order, a protective layer, an outermost ink receiving layer, an inner ink receiving layer, a core layer with a tongue and a groove, and optionally a balancing layer, wherein the ink receiving layers include a jetted and dried color image.

* * * * *